United States Patent [19]

Takada et al.

[11] 4,079,803
[45] Mar. 21, 1978

[54] ELECTROMAGNETIC GUIDANCE SYSTEM

[75] Inventors: Kazuaki Takada; Hisao Hanmura, both of Hitachi, Japan

[73] Assignee: Hitachi, Ltd., Japan

[21] Appl. No.: 756,865

[22] Filed: Jan. 4, 1977

[30] Foreign Application Priority Data

Jan. 7, 1976 Japan .................. 51-858

[51] Int. Cl.² ............................................ B60K 27/06
[52] U.S. Cl. .............................. 180/98; 104/148 MS; 318/587
[58] Field of Search ............... 180/98, 131; 179/82; 46/255, 259; 104/148 MS, 148 LM, 88; 318/587

[56] References Cited
U.S. PATENT DOCUMENTS 3,669,208 6/1972 Brooke .............................. 318/587
4,006,790 2/1977 Kawano ............................. 180/98

Primary Examiner—Trygve M. Blix
Assistant Examiner—Reinhard J. Eisenzopf
Attorney, Agent, or Firm—Craig & Antonelli

[57] ABSTRACT

A bogie is provided with a center detection coil, a right-hand detection coil and a left-hand detection coil in order to make the vehicle to run automatically along an electro-magnetic induction line installed in a running path in dependence on a steering signal produced by composing a vector of a voltage induced in the center detection coil by the magnetic flux generated by the induction line and a vector of selected one of the induced voltages of the right-hand and the left-hand detection coil. A correcting circuit is provided to produce a correcting voltage signal added to the steering signal so that the latter signal becomes zero when the center detection coil is positioned directly above the induction line.

4 Claims, 16 Drawing Figures

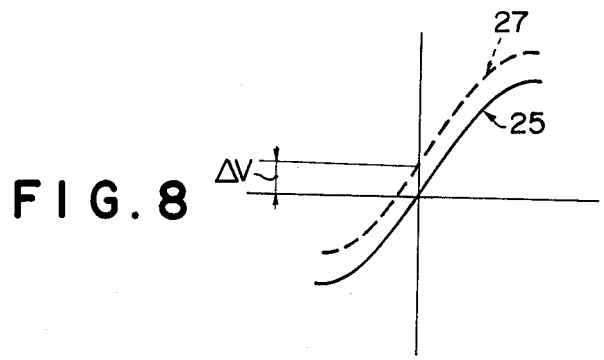
FIG. 8
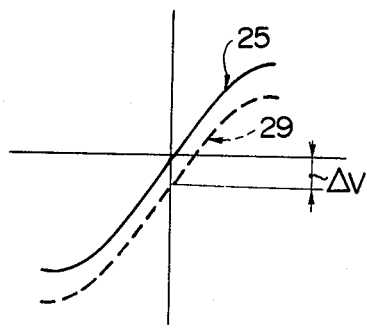
FIG. 9
FIG. 10
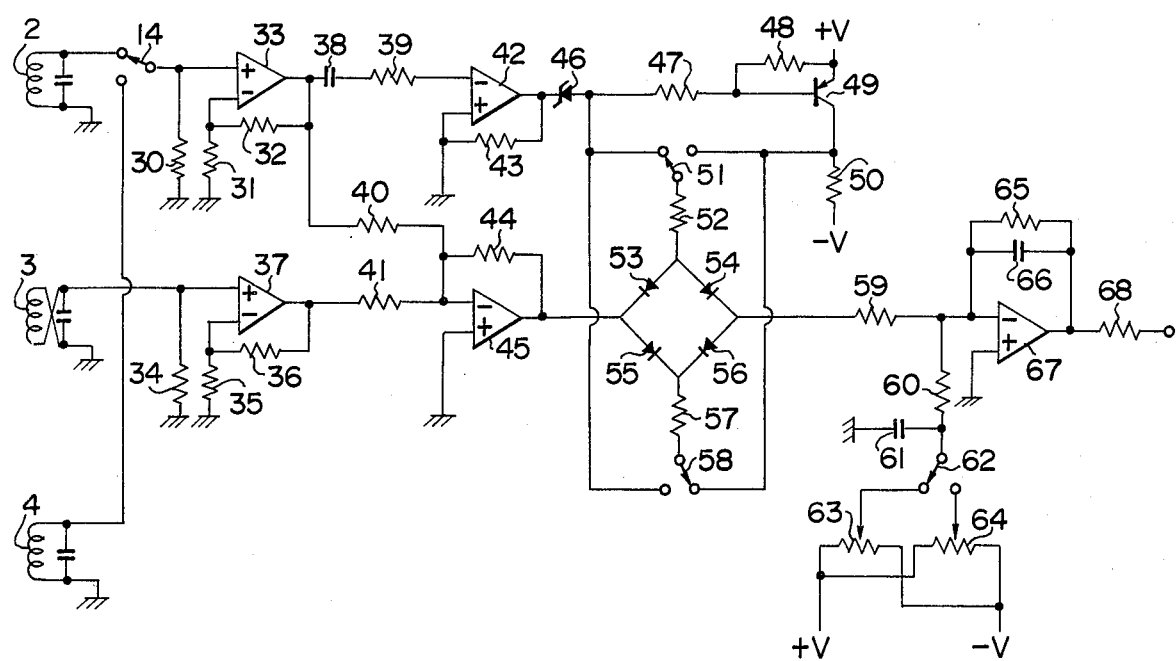

ELECTROMAGNETIC GUIDANCE SYSTEM

BACKGROUND OF THE INVENTION

1. Field of the Invention

The present invention relates to an automatic running vehicle of the electro-magnetic induction type in which the vehicle is made to run automatically along an electro-magnetic induction line installed in a running track. In more particular, the invention concerns with the automatic running vehicle of the type in which a bogie is provided with detection coils each at the center, left- and the right-hand locations thereof to detect the magnetic field generated by the electro-magnetic induction line installed along the running path and the vehicle is caused to run automatically along the electro-magnetic induction line in dependence on the voltages induced in the center and the right-hand detection coils or alternatively in the center detection coil and the left-hand detection coil with each other. The automatic running vehicle of such type is disclosed in U.S. patent application Ser. No. 539,424, now U.S. Pat. No. 4,006,790.

2. Description of the Prior Art

In the vehicle system of the above described type, it is known that, even if amounts of deviations of the vehicle body to the right or the left side from the center position are equal to each other when the vehicle is running in dependence on the steering voltage derived from the voltages induced in the center detection coil and the selected one of the voltage induced in the right-hand detection coil and the left-hand coil, the steering angle (angle in the absolute value in the sense that no direction is taken into consideration) will take different value in both cases.

In the first place, description will be made on a typical example of the hitherto known automatic running vehicle by referring to FIGS. 1 to 5. In FIG. 1A, reference numeral 1 denotes a bogie provided with a right-hand detection coil 2, a center detection coil 3 and a left-hand detection coil 4. An electro-magnetic induction line 5 is installed in the running ground 6. An alternating current flows constantly through the induction line 5. Magnetic flux produced by the current will be distributed in a pattern of coaxial circles around the line 5, in which the magnetic flux just above the induction line 5 extends in the horizontal direction. Accordingly, the output from the individual detection coils will become zero when the coils are positioned directly above the induction line 5. As the detection coils are displaced away from the position above the induction line 5, the absolute value of the respective output voltages thereof will increase, in which case the polarity thereof is decided in dependence on the direction of the flux. When the amount of the displacement of the detection coil exceeds a predetermined value, the output therefrom will then begin to decrease. Such characteristic of the output voltage of a detection coil is graphically represented in FIG. 2 by a curve 7. In this figure, then induced output voltage is taken along the ordinate, while the distance between the detection coil and the induction line is taken along the abscissa. The negative value of the induced voltage means that the direction of the influential magnetic flux is opposite to that of the magnetic flux inducing the positive voltage. When the alternative current is used, it is preferred that a dual wire parallel line such as a feeder line for a television receiver, for example, should be employed in an arrangement schematically shown in FIG. 1B.

The steering signal can be derived by composing the vector of the output from the center detection coil 3 and that of the right-hand detection coil 2 or that of the left-hand detection coil 4. In FIG. 3, the output signals from the center detection coil 3 and the left-hand detection coil 4 which are assumed to be used for producing the steering signal by way of example are illustrated simulatively by straight line segments. It will be appreciated that the same signal waveforms may be obtained with the polarities thereof being inverted when the center detection coil 3 is used in combination with the right-hand detection coil 2. In FIG. 3, reference character L represents the distances between the center detection coil CC corresponding to the coil 3 in FIG. 1A and the left-hand detection coil LC or coil 2 in FIG. 1A and between the former and the right-hand detect coil RC or coil 4 in FIG. 1A. The distance between the coils CC and LC is equal to the one between the coils CC and RC and remains constant since these coils are fixedly secured to the bogie 1. Curve 8 represents the characteristic of the voltage induced in the center coil CC, while curve 9 represents the voltage characteristic of the output signal from the left-hand detection coil LC. It is to be noted that, although the curve 9 follows in reality the profile of curve 8, the former is shown as shifted to the right by the distance L for the convenience' sake of illustration to show the addition of both signals. The steering signal is derived by composing vectors of the induced voltages represented by the curves 8 and 9. The steering signal thus obtained is shown by curve 10 in FIG. 3. In this way, mere composition of the outputs from the left-hand detection coil LC and the center detection coil CC results in the steering signal of the waveform shown by the curve 10 which however has zero point 0' shifted to the right-hand side by ΔL from the actual zero point 0, as viewed from the plane of FIG. 3. Usually, the vehicle is steered on the basis of the imaginary zero point 0' utilized as a reference for the steering. On the other hand, in the case where the right-hand detection coil RC is employed in combination with the center detection coil CC, the corresponding zero point is shifted to the left by ΔL to −0'.

FIG. 4 illustrates a rightwardly shifted running path 11 of the vehicle steered in accordance with the steering signal derived from the output signals of the center and the right-hand detection coils CC and RC as well as a leftwardly shifted running path 12 of the vehicle when the center and the left-hand detection coils CC and LC are employed. Since the running path of the vehicle will become different considerably in dependence upon whether the right- or left-hnd detection coil RC or LC is used together with the center detection coil CC as can be seen from FIG. 4, there may arise difficulties such that different distances between the vehicle and an unloading platform 13 may provide an obstacle in the transporting works of the loads from the vehicle 1 to the platform 13, for example. In particular, when the unloading operation is to be carried out automatically, variations in the distance between the vehicle 1 and the platform 13 makes the load transferring operations remarkably difficult. Furthermore, when the vehicle is changed over from the right side running path 11 to the left side running path 12 during the running of the vehicle, there may arises a danger of meandering movement of the vehicle 1 such as shown in FIG. 5. Such danger will of course increase particularly when the running vehicle is transporting a great amount of load or running at a high speed. Even in the case where the deviation of the running path can be tolerated, it is inevitable that unnecessary large width of the running track is required. Besides, the danger that the vehicle should strike against men working in the track area has to be considered.

SUMMARY OF THE INVENTION

An object of the invention is therefore to provide an automatic running vehicle which avoids the various drawbacks of the hitherto known vehicle described above.

Another object of the invention is to provide an automatic running vehicle which can run with a stable running performance regardless of whether the right-hand or the left-hand detection coil is employed in combination with the center detection coil by providing a means to allow the vehicle to be positioned directly above the induction line at which the steering signal becomes zero.

Still another object of the invention is to provide an automatic running vehicle or bogie which can be steered by tacking the zero point which undergoes no influence due to the change-over of the detection coils.

With the above objects in view, the invention proposes an improved automatic running vehicle system of the electro-magnetic induction type in which an appropriate correcting signal is added to the steering signal with a view to preventing the zero point thereof from being varied in dependence upon whether the left-hand or the right-hand detection coil is used in combination with the center detection coil.

BRIEF DESCRIPTION OF THE DRAWINGS

FIGS. 8 and 9 show waveforms of steering signals obtained in accordance with the teaching of the invention.

FIG. 10 is a detailed circuit diagram of a control apparatus according to an embodiment of the invention.

DETAILED DESCRIPTION OF THE PREFERRED EMBODIMENTS

Figure 6:
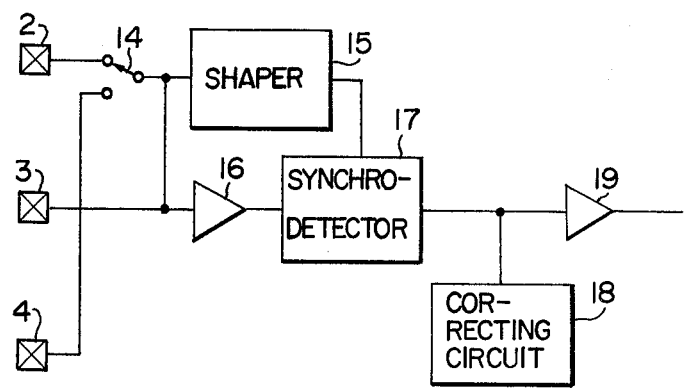
FIG. 6 is a block diagram to illustrate the principle of the invention.

Referring to FIG. 6 which is a block diagram to illustrate the principle of the invention to apply an appropriate correcting signal to the steering signal so that the zero point thereof is brought directly above the induction line, reference numeral 14 denotes a change-over switch, 15 a shaper such as a rectangular wave generator circuit, 16 a summing amplifier, 17 a synchronous detector circuit, 18 a correcting voltage setting circuit and 19 an output amplifier circuit. In operation of this circuitry, either the right-hand or left-hand detection coil 2 or 4 to be used is selected by the changeover switch 14. The induced voltage of either the right-hand or left-hand detection coil 2 or 4 is shaped into a rectangular signal waveform by the rectangular signal wave generator or shaper circuit 15 in synchronism with the associated induction voltage. The voltage signal from the coil 2 or 4 is also applied to the summing amplifier circuit 16 and added with the induced voltage from the center detection coil 3. The output signal from the summing amplifier 16 is subjected to synchronous detection in the synchronous detector circuit 17 with the rectangular signal produced by the shaper circuit 15 in synchronism with the voltage induced in the right- or left-hand coil 2 or 4. The output signal from the synchronous detector 17 is applied to the output amplifier circuit 19 at the input stage thereof which is coupled also to the output of the correcting voltage setting circuit 18. The correcting voltage signal set by the circuit 18 serves to maintain the same zero point of the steering signal output from the output amplifier 19 regardless of whether the right-hand or the left-hand detection coil 2 or 4 is used together with the center detection coil 3. The correcting voltage setting circuit 18 has incorporated therein a change-over switch (not shown) interlocked with the change-over switch 14 so that the correcting voltages of the different polarities may be applied to the output amplifier circuit 19 in dependence on whether the right-hand or the left-hand detection coil 2 or 4 is used in combination with the center coil 19.

Figure 1A:
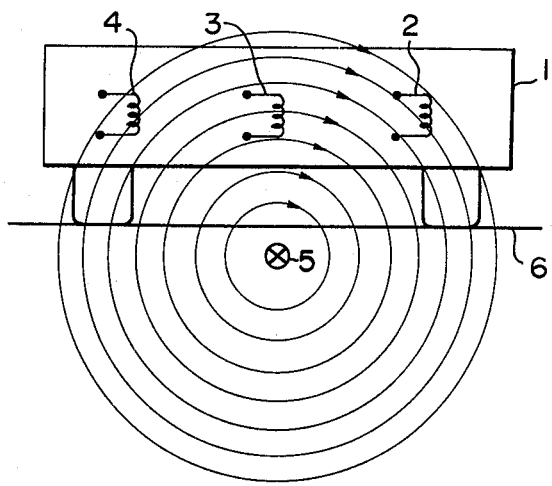
FIG. 1A shows schematically an automatic running bogie of the electro-magnetic induction type together with an induction line therefor and a magnetic field produced by the latter.
Figure 1B:
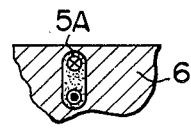
FIG. 1B shows another arrangement of the induction line.
Figure 2:
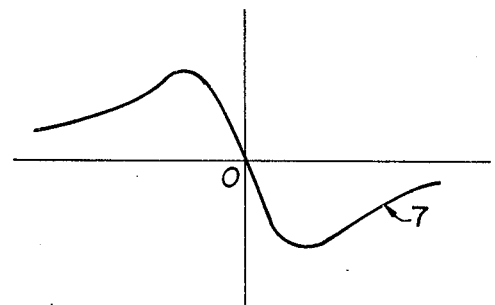
FIG. 2 illustrates graphically the induced voltages of the respective detection coils.
Figure 3:
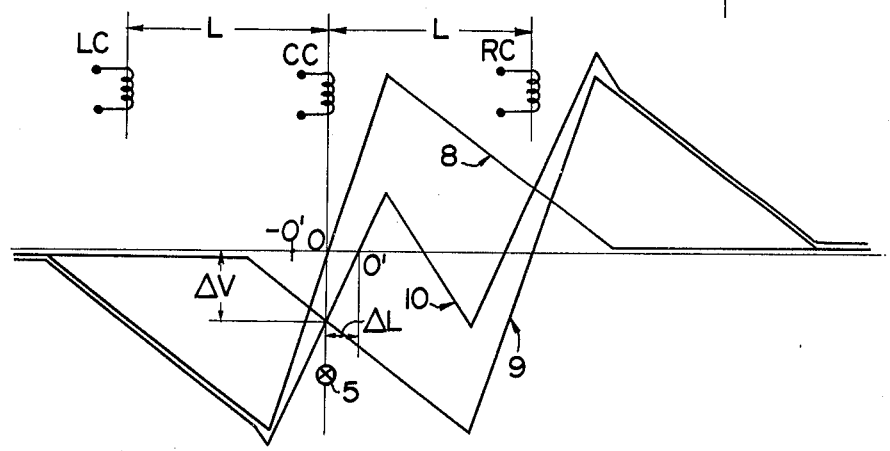
FIG. 3 illustrates graphically steering signals derived from the output signals of the detection coils in a vehicle of the prior art.
Figure 4:
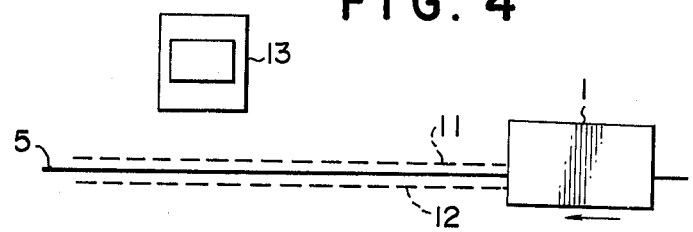
FIG. 4 and 5 show schematically running paths followed by the vehicle of the prior art.
Figure 5:
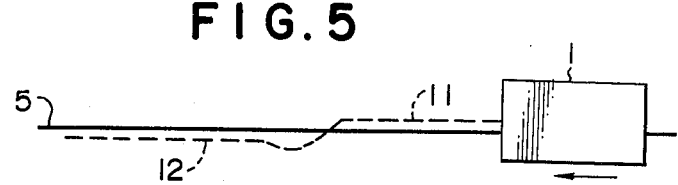
Figure 7A:
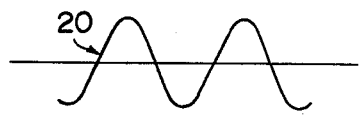
FIG. 7A to 7F are signal waveform diagram to illustrate the operation of the apparatus shown in FIG. 6.
Figure 7B:
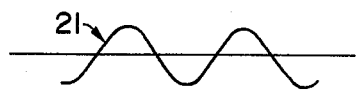
Figure 7C:
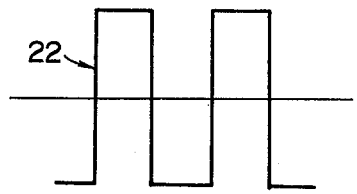
Figure 7D:
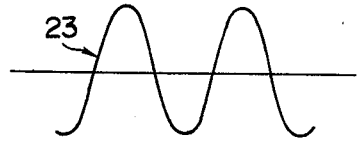
Figure 7E:
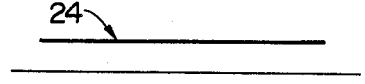
Figure 7F:
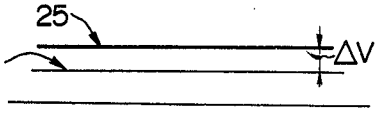

FIGS. 7A to 7F are to illustrate the operation of the apparatus shown in FIG. 1 with the aid of signal waveforms. In this connection, assumption is made such that the right-hand detection coil 2 is used in combination with the center detection coil 3 and that the dual parallel wire induction line is positioned between these coils. In FIG. 7A, curve 20 represents the waveform of the voltage induced in the center detection coil 3. In FIG. 7B, curve 21 represents the waveform of the voltage induced in the right-hand detection coil 2. In FIG. 7C, curve 22 represents the rectangular signal generated in synchronism with the induced voltage of the right-hand detection coil 2. In FIG. 7D, curve 23 represents the output signal waveform from the summing amplifier 16. In FIG. 7E, curve 24 represents the output signal waveform from the synchronous detection circuit 17. Finally, in FIG. 7F, curve 25 represents the steering signal as output from the output amplifier circuit 19. It will be seen that the required correcting voltage $\Delta V$ from the correcting voltage setting circuit 18 is additively contained in the steering signal 25.

FIGS. 8 and 9 graphically illustrate the relationship between the corrected steering signal available from the signal detection circuit schematically shown in FIG. 6 and the distance deviation between the center detection coil 3 and the induction line 5. Illustration in FIG. 8 corresponds to the case where the right-hand detection coil 2 is used in combination with the center detection circuit 3. Symbol $\Delta V$ represents the correcting voltage set by the circuit 18 in the above case, while dotted curve 27 represents the steering signal which has not been corrected by the correcting voltage $\Delta V$ in the case of the above combination of the detection coils 2 and 3. In FIG. 8, distance deviation between the center detection coil 3 and the induction line is taken along the abscissa. It will be seen from FIG. 8 that the zero point of the non-corrected steering signal 27 does not correspond to the position of the center detection coil 3 directly above the induction line 5 but is shifted to the left-hand side as viewed orthogonally to the plane of FIG. 8. The graphic illustration of FIG. 9 corresponds to the case where the combination of the left-hand detection coil 4 and the center detection coil 3 is employed. Symbol ΔV represents the correcting voltage set by the circuit 14, while the broken curve 29 represents the steering signal which has not been corrected by the correcting voltage ΔV in the case of the above combination of the detector coils 3 and 4. In FIG. 9, the distance deviation between the center detection coil 3 and the induction line 5 is taken also along the abscissa. It will be seen from FIG. 9 that the zero point of the non-corrected steering signal does not correspond to the position of the center detection coil located directly just above the induction line 5 but is shifted to the right-hand side. From FIGS. 8 and 9, it will now be understood that, when no correcting voltage ΔV is applied, the zero position of the steering signal followed by the electro-magnetically inducted vehicle will vary in the case where the right-hand detection coil 2 is used with the center detection coil 3 and the case where the left-hand detection coil 4 is used in combination with the latter. However, in both of these cases, the zero point of the steering signal remains the same by additively or substractively utilizing the correcting voltage ΔV.

Next, a concrete example of the signal detecting and correcting circuit according to the invention will be described with reference to FIG. 10. As described hereinbefore, the change-over switch 14 serves to select the right-hand or the left-hand detection coil 2 or 4 to be used with the center detection coil 3. It is assumed that the right-hand detection coil 2 is selected in the case of this embodiment. The output signal from the right-hand detection coil 2 is amplified by an amplifier 33 with an amplification factor determined by resistors 30, 31 and 32. In a similar manner, the output signal from the center detection coil 3 is amplified by an amplifier 37 to a magnitude determined by resistors 34, 35 and 36. The signals amplified by the amplifiers 33 and 37, respectively, are then fed to an amplifier 45 through resistors 40 and 41 and amplified to a magnitude determined by a resistor 44. The output from the amplifier 45 is applied to the synchronous detection circuit. The signal for the synchronous detection is provided by the output from the aforementioned amplifier 33. In this regard, the output signal from the amplifier 33 is supplied to an amplifier 42 having a resistor 43 through a capacitor 38 and a resistor 39 to be shaped into a rectangular waveform signal. The output from the amplifier 42 is input to a transistor 49 through a Zener diode 46 and resistors 47 and 48. The transistor 49 has an emitter connected to a positive potential source V and a collector connected to a negative potential source -V through a resistor 50. With such circuit arrangement, a rectangular waveform signal will appear at the collector of the transistor 49, which signal is out of phase with the output signal from the amplifier 42 by an amount π. The output from the amplifier is also fed to an end of a diode bridge circuit composed of the diodes 53 to 56 through a change-over relay switch 51 and a resistor 52. On the other hand, the output of the transistor 49 is fed to the diametrically opposed end of the diode bridge circuit through a change-over relay switch 58 and a resistor 57. The output from the amplifier 45 is also applied to a remaining input terminal of the diode bridge circuit (53 – 56) and detected in synchronism with the induced signal of the right-hand detection coil 2 with the aid of the rectangular waveform signal produced by the amplifier 42 and the transistor 49, whereby only the half-wave of the signal from the amplifier 45 is taken out through a resistor 59. The half-wave signal as synchronously detected is then applied to an amplifier 67 through the resistor 59, which amplifier 67 is additionally supplied through a change-over relay switch 62 and a resistor 60 with a voltage determined by a correcting voltage setting resistor 63. At that time, the resistor 60 is coupled between a positive and a negative potential. A capacitor 61 serves to stabilize the correcting voltage applied to the amplifier 67. The amplifier 67 having a feedback loop of a resistor 65 and a capacitor 66 connected in parallel serves to smooth and amplify the output signal from the diode bridge circuit (53 – 56) added with the correcting voltage as set by the correcting voltage setting resistor 63. The output signal from the amplifier 67 is taken out as the steering signal through a protecting resistor 68. It will be appreciated that the correcting voltage signal ΔV shown in FIG. 8 is obtained by correspondingly adjusting the resistor 63 for setting the correcting voltage at a desired value.

The change-over relay switches 14, 51, 58 and 62 are interlocked with one another. When the left-hand detection coil is to be used, these switches are changed over to the other terminals and the correcting voltage ΔV shown in FIG. 9 can be obtained by means of the correcting voltage setting resistor 64.

In the above description, it has been assumed that the arrangement of the induction line and the detection coils such as shown in FIG. 1 is employed. However, the teaching of the invention can be equally applied to the case where the horizontal component of the magnetic flux generated by the induction line as well as to the case where the dual parallel wire induction line is installed geometrially in parallel with the surface of the ground.

We claim:

1. An automatic running vehicle adapted to run along an electro-magnetic induction line installed in a running path of the vehicle, comprising a center detection coil, a left-hand detection coil and a right-hand detection coil mounted on a running bogie of said vehicle for detecting a magnetic field generated around said induction line, wherein each of said left-hand and right-hand detection coils is laterally distanced from said center detection coil by a predetermined distance, means for controlling said bogie to run automatically along said induction line in dependence on a steering signal, and means for generating said steering signal by composing a vector of a voltage induced either in said right-hand or said left-hand detection coil and a vector of a voltage induced in said center induction coil, the improvement comprising correcting circuit means independent of said detection coils for producing a correcting signal to be added to said steering signal to set said steering signal at a zero point when said center detection coil is positioned directly over said induction line.

2. An automatic running vehicle as set forth in claim 1, wherein the voltage induced in said induction coil and selected one of voltages induced in said right-hand or left-hand induction coils are fed to a synchronous detection circuit, the output of which is added to said correcting voltage to produce said steering signal.

3. An automatic running vehicle as set forth in claim 2, further comprising a first switching circuit for applying the voltage induced in said detection circuit together with the selected one of the voltages induced in said right-hand and left-hand detection coils to said synchronous detection circuit, two voltage sources for producing two correcting voltages selectively applied to the output of said synchronous detection circuit, and a second switching circuit interlocked with said first switching circuit and adapted to selectively and alternatively apply one of said correcting voltages to the output of said synchronous detection circuit.

4. An automatic running vehicle as set forth in claim 2, wherein all of said center, right-hand and left-hand detection coils are adapted to detect vertical components of the magnetic flux produced by said induction line.

* * * * *